March 26, 1935.  G. W. CLARK  1,995,797

CASING FOR BICYCLE ACCESSORIES

Filed Sept. 6, 1934

INVENTOR
George W. Clark
BY Chapin + Neal
ATTORNEYS

Patented Mar. 26, 1935

1,995,797

UNITED STATES PATENT OFFICE 1,995,797

CASING FOR BICYCLE ACCESSORIES

George W. Clark, Westfield, Mass., assignor to The Westfield Manufacturing Company, Westfield, Mass., a corporation of Massachusetts Application September 6, 1934, Serial No. 742,911

5 Claims. (Cl. 224—32)

This invention relates to improvements in casings for bicycle accessories. It is an improvement upon my previous invention shown in copending application Serial No. 726,067, filed May 17, 1934.

In this case (as also in the case of my earlier invention) the plan is to provide means to carry accessories such as lamp, horn, dry batteries, etc. at the front of a bicycle, in a casing which is not only characterized by a better mechanical arrangement but also by its artistic effect with respect to the total appearance of the bicycle with the casing on it. As in my previous invention, I get the artistic effect by the mechanical arrangement of the casing parts into a form like the "figurehead" of a vehicle. But the invention herein claimed is in the mechanical nature of the parts rather than the particular artistic merit of the design per se. The latter may be varied in many ways without departing from the mechanical features of the invention. When the latter are used as a combination they give artistic merit, even in widely different specific designs.

The improvements are disclosed in the accompanying drawing, in which—

Figure 3:
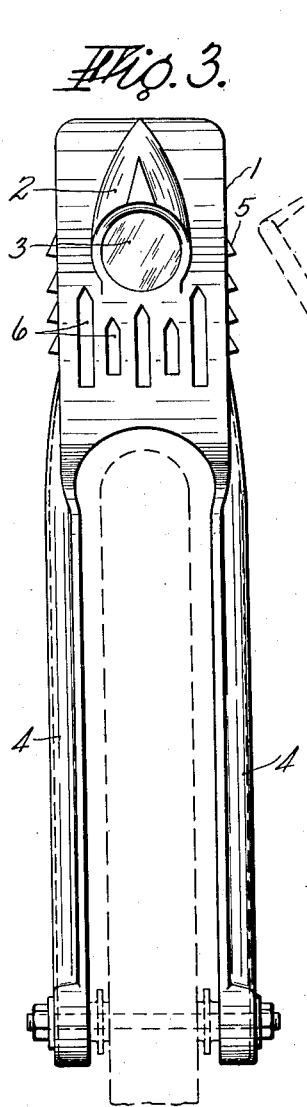
Fig. 3 is a front view of the casing in vertical position apart from the bicycle.
Figure 4:
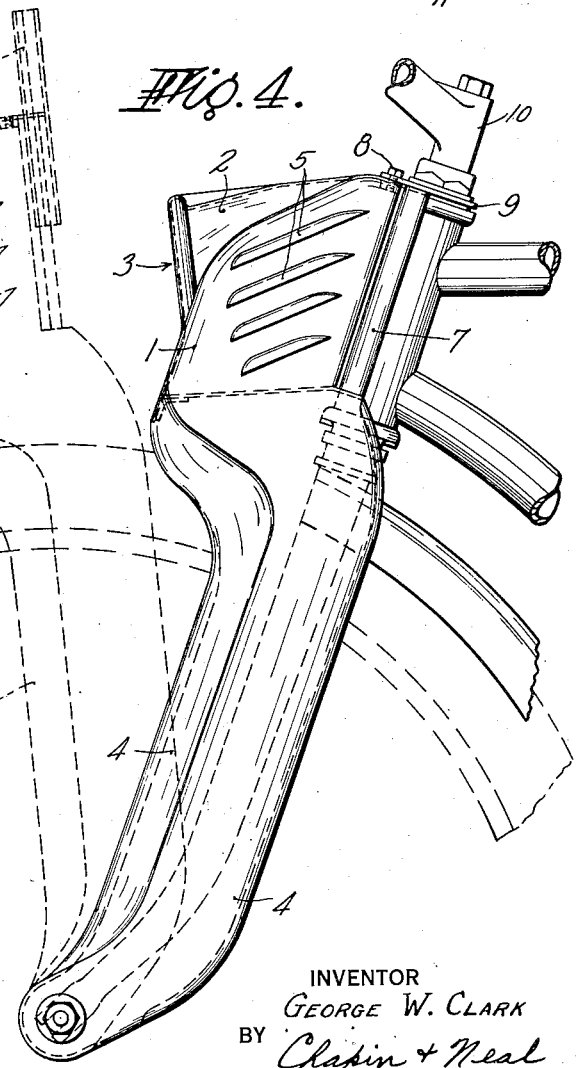
Fig. 4 is a side view of the casing mounted on the bicycle and indicating in dotted lines the position to which the casing is moved for access to the interior.

Referring to Figs. 3 and 4, the casing is made with body portion 1, having a length about the same as the head post of the bicycle; the head portion 2, preferably slanting forwardly and downwardly (without any neck portion) and provided with a lens opening in front at 3 for a lamp inside the casing; two leg portions 4 extending downwardly from body portion for attachment at each side of front axle.

The carrying capacity of the casing is in the body portion 1 and head portion 2. These parts at the top both slant forwardly and downwardly, the head portion arranged after the fashion of a dormer window merged into the slanting roof of the body portion. The body 1 has a width about equal to the spread of legs 4. The legs are joined to each side of the body in streamline (or tailored fashion) and the arrangement is given an exaggerated military effect by having the legs straight and to the rear of the body portion. The latter is "pushed out" in front and is all "chest". This military appearance is seen best from the side in Fig. 4.

At each side of the casing I provide slanting louvers 5. In the front I provide decorative openings 6 for the emission of noise from a horn in the casing.

This figurehead casing I mount with the legs standing on opposite ends of the front wheel hub where they are fastened by the end nuts on the hub, see Fig. 3. From the front hub the whole casing may be swung forwardly to the dotted line position in Fig. 4 where access may be had to the casing through a sliding door 7 at the rear. To hold the casing in place I provide a transverse plate or disk 9, mounted on the steering post 10, and a cap screw 8 engaging a thread in a boss at the top of the casing. By removing screw 8 the whole casing can swing forwardly, as indicated in Fig. 4.

When the parts are in the full line position of Fig. 4, the whole casing turns with the steering post and the front wheel. From the front the figure of the casing appears as straddling the front wheel, with legs braced on the front axle. The fork and head post are hidden. From the side the forks are also hidden but the head post can be seen. By letting the latter appear from the side, the arrangement for steering with the casing on the bicycle is made easier as compared to my former structure. Of course the head post does not turn and with the sides of the casing far enough apart to hide the head post and also to turn without hitting the bicycle frame too soon, one is in difficulty with respect to the limits of the width of casing. It is preferable, I have found, not to make the casing wide enough to provide for both the steering function and the hiding of the head post. This difficulty does not arise with respect to hiding the fork members of the bicycle at the sides as well as the front. And I provide for this by giving the backward sweep to the leg portions at the rear, see Fig. 4. There is also an outward cant to the casing walls of the leg portions, as seen at 11 in Fig. 2, for giving plenty of steering angle without the casing parts hitting the frame.

It will be seen from the foregoing description that while the parts of the casing are deliberately arranged to give the artistic merit in the figurehead structure of the casing, the same arrangement has a mechanical purpose, particularly with respect to covering the front of the bicycle and to provide for steering with the casing turning through the steering angle.

Figure 1:
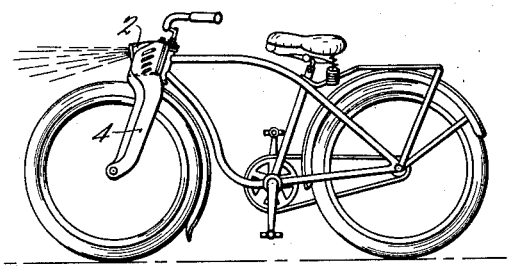
Fig. 1 is a side view of a bicycle with my new casing on it.
Figure 2:
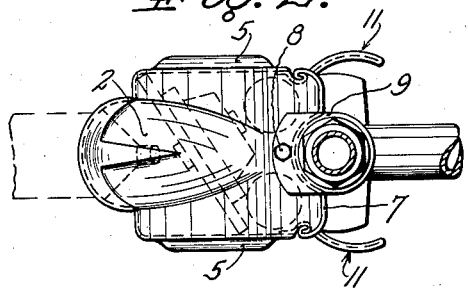
Fig. 2 is a top view of the casing with parts of the supporting bicycle broken away.

It is desirable to make the casing of sheet metal. The form of its rear door or cover 7 and its sliding connection with the casing is seen in Figs. 2 and 4. The bottom of the casing carrying capacity is indicated in Fig. 4. I have indicated dry batteries, horn, lamp, and reflector by dotted lines within the casing in Fig. 2. These things will all be understood without showing exact supports and wiring for switches, etc. I prefer to have switches mounted on the casing so the whole accessory combination will be a self-contained unit, all ready for complete functioning when the casing with appropriate contents is merely attached to the bicycle. But others may prefer to have the switches on the handlebars and wired from there to the casing with appropriate swinging connections. I have not shown these things as any one can arrange them to suit his own desires.

When the casing is mounted on the bicycle from most angles it gives the illusion of functioning as a head post, through which one steers the front wheel from the handlebars because most of the actual steering parts are hidden by the casing. In this way the accessory casing appears to be a part of the bicycle mechanism and avoids the appearance so often objectionable of mere attachments. As in my former invention, and also here, the manner of dressing the bicycle is highly desirable.

Having disclosed and described my invention, what I claim is:

1. The combination of a bicycle and a streamlined accessory casing having a body portion the length of the head post, and leg portions extending from the body portion to straddle the front wheel and rest on the ends of the front axle with a pivotal mounting for the whole casing, means to removably clamp the body portion at the top to the steering post whereby the casing will turn as a unit with the steering mechanism, a door in the rear of the casing positioned so that it can be opened only when the casing is unclamped at the top and swung forwardly from the top on its pivoted bottom supports.

2. The combination of a bicycle and an accessory casing mounted in the form of a figurehead in front of the head post, said casing being mounted on the front axle and on the steering post for spaced supports, the lower portion of the casing being offset from the upper portion so as to cover the front fork from the sides but leave the head post uncovered whereby the upper part of the figurehead casing lies forwardly of the head post and can turn with the steering mechanism without hitting the frame parts.

3. The combination of a bicycle and an accessory casing with the walls of its carrying chamber located forwardly of the head post and of about the width of the front fork and length of the head post, a portion of said walls being arranged in a head portion at the top after the fashion of a dormer window in the top of the casing, a door in the rear of such chamber located immediately in front of the head post, leg portions to support said casing and shaped to overlap the bicycle forks and forming with the walls of the carrying chamber a unitary streamlined figurehead, said casing being mounted at the bottom on the front axle and at the top on the steering post whereby the figurehead turns with the steering mechanism, the side walls of said carrying chamber being stopped off in the rear so as not to substantially overlap the head post whereby interference with the steering function is avoided as the figurehead turns to either side.

4. The combination of a bicycle and an accessory casing mounted for pivotal support on the front axle and extending from such support to the top of the steering post and detachably connected to the latter to turn with the steering mechanism, an opening for access to the casing located in front of the front post of the bicycle and close thereto, a door for said opening, adapted to be opened to give access to the casing only when the casing is swung forwardly on its bottom pivotal support.

5. The combination of a bicycle and an accessory casing, the walls of the latter being formed to make a body portion to stand out like a chest in front of the head post and hide the latter except at the sides and to make leg portions for support and to hide the front fork members at front and sides, the front wall of said casing slanting forwardly and downwardly to the top level of the fork and then slanting backwardly in two parts to straddle the front wheel and merge into the leg portions, the walls of said leg portions lying about centrally of the line of the fork and head post but the walls of the body portion lying in front of said line, said casing being supported top and bottom on the steering parts of the bicycle.

GEORGE W. CLARK.